United States Patent
Zhou et al.

(10) Patent No.: US 12,479,867 B2
(45) Date of Patent: Nov. 25, 2025

(54) PROCESSES FOR SYNTHESIZING UNSYMMETRICAL DISILOXANES

(71) Applicant: DOW SILICONES CORPORATION, Midland, MI (US)

(72) Inventors: Xiaoyuan Zhou, Midland, MI (US); Zhanjie Li, Midland, MI (US); Eric Joffre, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 749 days.

(21) Appl. No.: 17/784,084

(22) PCT Filed: Dec. 11, 2020

(86) PCT No.: PCT/US2020/064526
§ 371 (c)(1),
(2) Date: Jun. 9, 2022

(87) PCT Pub. No.: WO2021/119437
PCT Pub. Date: Jun. 17, 2021

(65) Prior Publication Data
US 2023/0099625 A1 Mar. 30, 2023

Related U.S. Application Data

(60) Provisional application No. 62/947,653, filed on Dec. 13, 2019.

(51) Int. Cl.
*C07F 7/08* (2006.01)
(52) U.S. Cl.
CPC .................................. *C07F 7/0874* (2013.01)
(58) Field of Classification Search
None
See application file for complete search history.

(56) References Cited

U.S. PATENT DOCUMENTS

| | | | |
|---|---|---|---|
| 3,223,686 | A | 12/1965 | Giulio et al. |
| 6,258,902 | B1 | 7/2001 | Campbell et al. |
| 6,624,254 | B1 | 9/2003 | Arriola et al. |
| 8,742,155 | B2 | 6/2014 | Honma |
| 9,272,258 | B2 | 3/2016 | Bade et al. |
| 9,388,265 | B2 | 7/2016 | Burns et al. |
| 12,180,238 | B2 * | 12/2024 | Zhou .................... C07F 7/0801 |
| 2011/0186537 | A1 * | 8/2011 | Rodriguez San Juan .................... C23C 16/30 118/696 |
| 2015/0265990 | A1 | 9/2015 | Chao et al. |

FOREIGN PATENT DOCUMENTS

| | | |
|---|---|---|
| EP | 0679676 A2 | 11/1995 |
| JP | 2003252881 A | 9/2003 |
| RU | 2524342 C1 * | 7/2014 |

OTHER PUBLICATIONS

L. Mathias et al., 113 Journal of the American Chemical Society, 4043-4044 (1991) (Year: 1991).*
A. De Vekki et al., 71 Russian Journal of General Chemistry (Translation of Zhurnal Obshchei Khimii) (2001), 1912-1923 (2001) (Year: 2001).*
Leonard et al., Advanced Practical Organic Chemistry 128-226 (2nd ed., 1995) (Year: 1995).*
L. Shaffer et al., The Hydrolysis of Alkyl and Aryl Chlorosilanes. I. Conductometric Titration, 61 The Journal of Physical Chemistry, 1591-1595 (1957) (Year: 1957).*
U. Scheim et al., 356 Journal of Organometallic Chemistry, 141-149 (1988) (Year: 1988).*
E. Poposki et al., 494 Zeitschrift fuer Anorganische und Allgemeine Chemie, 166-178 (1982) (Year: 1982).*
Mathias, et al., "Hyperbranched Poly(siloxysilanes)", Journal of American Chemical Society, vol. 113, Jan. 1, 1991, 2 pages.
Voronkow, et al. "Cleavage of siloxanes with organyltrifluoro- and diorganyldifluorosilanes", Journal of Organometallic Chemistry, vol. 433, No. 1-2, Jul. 21, 1992, 9 pages.
Shintani, "Polymer Bulletin." 1996, p. 705-710, vol. 37.
Zeldin, "J. Organomet. Chem." 1987, p. 341-346, vol. 326.

* cited by examiner

*Primary Examiner* — Alexander R Pagano
(74) *Attorney, Agent, or Firm* — Condo Roccia Koptiw LLP

(57) ABSTRACT

Described herein are methods for making alkenyl disiloxanes, comprising combining an alkenyl halosilane with an alkyl halosilane and adding the mixture to water, an acidic aqueous solution, or a basic aqueous solution. The ratio of the alkenyl halosilane to the alkyl halosilane is about 10:1 to about 1:10. The alkenyl halosilane and the alkyl halosilane are mixed at about 20° C. to about 45° C. The reaction product is separated and washed with saturated alkali carbonate solution.

20 Claims, 1 Drawing Sheet

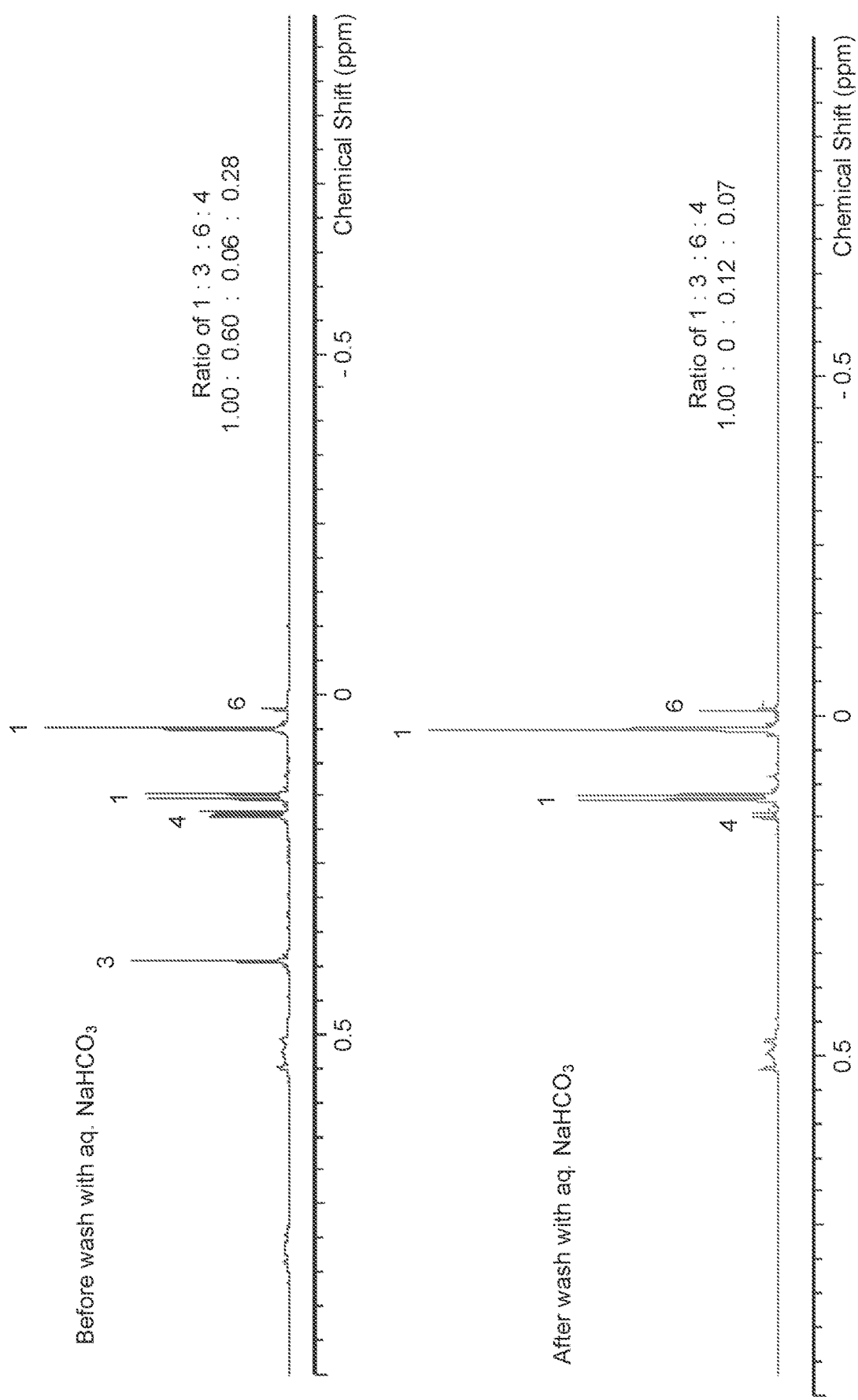

PROCESSES FOR SYNTHESIZING UNSYMMETRICAL DISILOXANES

CROSS REFERENCE TO RELATED APPLICATION

This application is the National Stage Entry under 35 U.S.C. § 371 of Patent Cooperation Treaty Application No. PCT/US2020/064526, filed Dec. 11, 2020, which claims the benefit of Provisional U.S. Patent Application No. 62/947,653, filed Dec. 13, 2019, the disclosures of each of which are incorporated herein by reference in their entireties.

BACKGROUND

Silane monomers are an important group of monomers. Preferred silane monomers have a desirable combination of purity, reactivity, and cost effectiveness. Alkenyl disiloxanes are a class of silane monomers that are particularly useful, for example, as self-polymerizing monomers.

Accordingly, what is needed are new processes for synthesizing alkenyl disiloxanes.

SUMMARY

Described herein are methods for making alkenyl disiloxanes, comprising combining an alkenyl halosilane with an alkyl halosilane and adding the mixture to water, an acidic aqueous solution, or a basic aqueous solution. The ratio of the alkenyl halosilane to the alkyl halosilane is about 10:1 to about 1:10. The alkenyl halosilane and the alkyl halosilane are mixed at about 20° C. to about 45° C. The reaction product is separated and washed with saturated alkali carbonate solution.

BRIEF DESCRIPTION OF THE DRAWINGS

FIG. 1 is a pair of nuclear magnetic resonance (NMR) spectra showing the removal of a reactant via a sodium bicarbonate wash step.

DETAILED DESCRIPTION

Described herein are methods for making alkenyl disiloxanes, comprising combining an alkenyl halosilane with an alkyl halosilane and adding the mixture to water, an acidic aqueous solution, or a basic aqueous solution. Preferably, the alkenyl halosilane and the alkyl halosilane are added to water. In an example, no organic solvent is present.

"Alkyl" is a saturated hydrocarbon (e.g., including methyl, ethyl, propyl, butyl, pentyl, hexyl, and other alkyl groups). "Alkenyl" is a hydrocarbon with an unsaturated bond (e.g., including vinyl, allyl, butenyl, pentenyl, hexenyl, heptenyl, and other alkenyl groups, such as norbornenyl). "Disiloxane" is a compound having a formula of $(R)_3$—Si—O—Si—$(R)_3$, where, in the case of an alkyl disiloxane, R is, independently at each occurrence, H or C1-C10 alkyl, and in the case of an alkenyl disiloxane, R is, independently at each occurrence, H, C1-C10 alkyl, and at least one alkenyl. "Halo" is F, Cl, Br, and I, preferably the halo group is Cl or Br, and most preferably, Cl. Preferably, the alkenyl halosilane is an alkenyl chlorosilane. Preferably, the alkenyl disiloxane is an alkenyl tetramethyl disiloxane.

Described herein are alkenyl disiloxanes, and more specifically, compounds of Formula I:

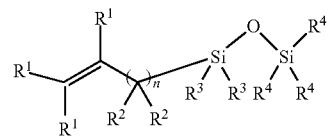

wherein:
n is 0 (meaning that Si is connected directly to the $(R^1)_2C=C(R^1)$-group, e.g., vinyl), 1, 2, 3, 4, 5, or 6;
$R^1$ is, independently at each occurrence, H or C1-3 alkyl;
$R^2$ is, independently at each occurrence, H or C1-3 alkyl;
also provided that one or more of $R^1$ and one or more of $R^2$ can combine to form a ring;
$R^3$ is, independently at each occurrence, H or C1-6 alkyl; and
$R^4$ is, independently at each occurrence, H or C1-6 alkyl.
Preferably, n is 3, 4, or 5. More preferably, n is 4.
Preferably, $R^3$ is C1-3 alkyl at each occurrence. More preferably, $R^3$ is methyl at each occurrence.
Preferably, one of $R^4$ is H and the remaining $R^4$ are C1-3 alkyl at each occurrence. More preferably, one of $R^4$ is H and the remaining $R^4$ are methyl at each occurrence. In an example, both $R^3$ and two of $R^4$ are methyl (e.g., the compound of Formula I is an alkenyl tetramethyl disiloxane).

In an example, n is 4 and $R^1$ is H at each occurrence. Preferably, $R^2$ is H at each occurrence. Preferably, n is 4, $R^1$ is H at each occurrence, $R^2$ is H at each occurrence, $R^3$ is C1-3 alkyl at each occurrence, and one $R^4$ is H and the remaining $R^4$ are C1-3 alkyl at each occurrence. More preferably, the compound of Formula I is 1-(hex-5-en-1-yl)-1,1,3,3-tetramethyldisiloxane.

In another example, n is 4, $R^1$ is H at two occurrences and the remaining $R^1$ is C1 alkyl, $R^2$ is C1 alkyl at two occurrences and the remaining $R^2$ are H at each occurrence, $R^3$ is C1-3 alkyl at each occurrence, and one $R_4$ is H and the remaining $R^4$ are methyl at each occurrence. Preferably, the $R^1$ C1 alkyl and two $R^2$ C1 alkyl groups combine to form a ring. More preferably, the $R^1$ C1 alkyl and two $R^2$ C1 alkyl groups, along with the atoms to which they are attached, combine to form a 5 to 8-membered ring. More preferably, the $R^2$ may be attached to adjacent carbons. More preferably, the compound of Formula I is 5-norbornen-2-yl(ethyl)-1,1,3,3-tetramethyldisiloxane.

In yet another example, n is 4, $R^1$ is H at each occurrence, $R^3$ is C1-3 alkyl at each occurrence, and $R^4$ are each C1-3 alkyl. More preferably, the compound of Formula I is 5-hexenylpentamethyldisiloxane.

In yet another example, n is 0 (e.g., Si is connected directly to the $(R^1)_2C=C(R^1)$-group, e.g., vinyl), $R^1$ is H at each occurrence, $R^3$ is C1-3 alkyl at each occurrence, and at least two $R^4$ are C1-3 alkyl. More preferably, the compound of Formula I is vinyltetramethyldisiloxane or vinylpentamethyldisiloxane.

Described herein are methods for making a compound of Formula I, comprising combining an alkenyl halosilane with an alkyl halosilane and adding the mixture to water, an acidic aqueous solution, or a basic aqueous solution. Preferably, the alkenyl halosilane and the alkyl halosilane are added to water. Preferably, the alkenyl halosilane is an alkenyl chlorosilane. Preferably, the alkenyl halosilane and the alkyl halosilane are an alkenyl chlorosilane and an alkyl chlorosilane.

In an example of a process for making a compound of Formula I, a compound of Formula A is reacted with a compound of Formula B in the presence of water, an acidic aqueous solution, or a basic aqueous solution:

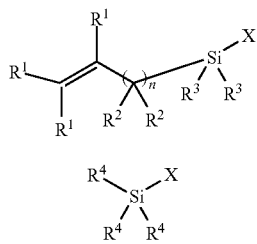

wherein:
X is, independently at each occurrence, F, Cl, Br, or I;
n is 0, 1,2,3,4, 5, or 6;
$R^1$ is, independently at each occurrence, H or C1-3 alkyl;
$R^2$ is, independently at each occurrence, H or C1-3 alkyl;
also provided that one or more of $R^1$ and one or more of $R^2$ can combine to form a ring;
$R^3$ is, independently at each occurrence, H or C1-6 alkyl; and
$R^4$ is, independently at each occurrence, H or C1-6 alkyl.

Preferably, X is, independently at each occurrence, Cl or Br. More preferably, X is Cl in both occurrences (e.g., in Formula A and in Formula B).

Preferably, n is 3, 4, or 5. More preferably, n is 4.

Preferably, $R^3$ is C1-3 alkyl at each occurrence. More preferably, $R^3$ is methyl at each occurrence.

In an example, n is 4 and $R^1$ is H at each occurrence. Preferably, $R^2$ is H at each occurrence. Preferably, n is 4, $R^1$ is H at each occurrence, $R^2$ is H at each occurrence, and $R^3$ is C1-3 alkyl at each occurrence. More preferably, the compound of Formula A is 5-hexenyldimethylchlorosilane.

In another example, n is 4, $R^1$ is H at two occurrences and the remaining $R^1$ is C1 alkyl, $R^2$ is C1 alkyl at two occurrences and the remaining $R^2$ are H at each occurrence, $R^3$ is C1-3 alkyl at each occurrence, and one $R^4$ is H and the remaining $R^4$ are methyl at each occurrence. Preferably, the $R^1$ C1 alkyl and two $R^2$ C1 alkyl groups combine to form a ring. More preferably, the $R^1$ C1 alkyl and two $R^2$ C1 alkyl groups, along with the atoms to which they are attached, combine to form a 5 to 8-membered ring. More preferably, the $R^2$ may be attached to adjacent carbons. More preferably, the compound of Formula A is 5-norbornen-2-yl(ethyl)chlorodimethylsilane.

In yet another example, n is 0 (e.g., Si is connected directly to the $(R^1)_2C=C(R^1)$-group, e.g., vinyl), $R^1$ is H at each occurrence, and $R^3$ is C1-3 alkyl at each occurrence. Preferably, the compound of Formula A is dimethylvinylchlorosilane.

Preferably, $R^4$ is H or C1-3 alkyl at each occurrence. More preferably, at least two occurrences of $R^4$ are methyl. Most preferably, the compound of Formula B is dimethylchlorosilane or trimethylchlorosilane.

The ratio of the compound of Formula A to the compound of Formula B is about 10:1 to about 1:10. Preferably, the ratio of the compound of Formula A to the compound of Formula B is about 1:5 to about 1:0.5. More preferably, the ratio of the compound of Formula A to the compound of Formula B is about 1:1.5 to about 1:0.8. More preferably, the ratio of the compound of Formula A to the compound of Formula B is about 1:1 to about 1:1.3. In another example, the ratio of the compound of Formula A to the compound of Formula B is such that there is more than one equivalent of the compound of Formula B in relation to the compound of Formula A.

The compound of Formula A and the compound of Formula B are mixed at about 20° C. to about 45° C., preferably about 25° C. to about 40° C., and more preferably at room temperature. The compound of Formula A and the compound of Formula B are mixed and then added to water, an acidic aqueous solution, or a basic aqueous solution dropwise. In an example, no organic solvent is present. In an example, no catalyst (e.g., alkali reagent) or buffer is present. Preferably, the compound of Formula A and the compound of Formula B are mixed and then added to water, an acidic aqueous solution, or a basic aqueous solution dropwise at a rate that keeps the reaction temperature under 20° C. The reaction mixture is stirred at about 20° C. to about 45° C., preferably about 20° C., for about 1 to about 2 hours, preferably about 1.5 hours, after completion of the addition of the compound of Formula A and the compound of Formula B.

A reaction product of the compound of Formula A and the compound of Formula B in the presence of water, an acidic aqueous solution, or a basic aqueous solution, is separated (e.g., the oil phase is taken) and washed with a neutralizing agent solution, such as an aqueous saturated $NaHCO_3$ solution (e.g., sodium bicarbonate). Alkali carbonates or other bicarbonates (e.g., potassium bicarbonate) or alkaline earth carbonates (e.g. magnesium carbonate) or ammonia may be used in addition to, or instead of, sodium bicarbonate as a neutralizing agent. Without wishing to be bound by theory, the sodium bicarbonate wash step appears to drive the reaction toward completion. Suitable neutralizing agents are known in the art and are commercially available. The resulting separated reaction product comprises the alkenyl disiloxane described above and one or more byproducts.

Silanol (e.g., a hydroxylated compound made from the compound of Formula A) is an undesirable byproduct. The amount of silanol in the crude product (e.g., after separating and washing with saturated $NaHCO_3$ solution, but before fractional distillation) is less than about 3%, less than about 2%, and less than about 1.5%. The amount of silanol in the crude product is determined by gas chromatography (GC), specifically the area under the relevant peak. Preferably, the ratio of the compound of Formula A to the compound of Formula B is about 1:1.1 to about 1:1.4 at the beginning of the reaction, and the amount of silanol in the crude product (e.g., after separating and washing with saturated $NaHCO_3$ solution, but before fractional distillation) is less than about 1%, less than about 0.5%, less than about 0.05%, and less than about 0.03%.

Another byproduct is a dimer of two compounds of Formula A, except that the X is replaced by a linking O (e.g., $(R^1_2C=CR^1(CR^2_2)_nSiR^3_2)_2$—O). Yet another byproduct is a dimer of two compounds of Formula B, except that the Cl is replaced by a linking O (e.g., $(HSiR^4_2)_2$—O). Without wishing to be bound by theory, stoichiometry may increase dimer formation and reduce silanol formation. The dimers are removed by fractional distillation.

The process may further comprise recovering the alkenyl disiloxane. Recovering the alkenyl disiloxane may be performed by any convenient means such as drying to remove water and/or a separate unit operation to remove the other byproducts described above, such as wiped film evaporation, stripping, or fractional distillation to remove these other byproducts. Drying may be performed by combining the separated product described above with a drying agent. The drying agent may be an adsorbent, such as an inorganic particulate with an average pore size sufficient to adsorb water, for example 10 Å (Angstroms) or less, preferably 5 Å or less, and more preferably 3 Å or less. Examples of adsorbents include zeolites, such as chabasite, mordenite, analcite, and combinations thereof. Examples of adsorbents include molecular sieves such as alkali metal alumino silicates, silica gel, silica-magnesia gel, activated carbon, activated alumina, calcium oxide, and combinations thereof. In another example, the drying agent may be a compound that forms a hydrate at room temperature, for example, one or more of, calcium chloride ($CaCl_2$), sodium sulfate ($Na_2SO_4$) calcium sulfate ($CaSO_4$), and magnesium sulfate ($MgSO_4$). Suitable drying agents are known in the art and are commercially available.

The following examples are for illustrative purposes only and are not intended to limit the scope of the appended claims.

-continued

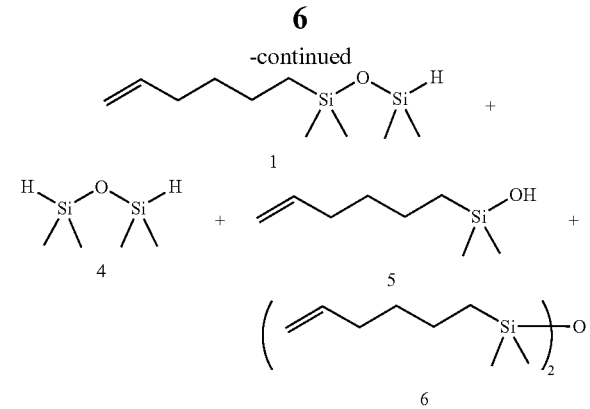

where 4, 5, and 6 are byproducts. The chemical names, corresponding structures, and numerical abbreviations used below are given in TABLE 1.

TABLE 1

| Chemical name | Structure | Abbreviation |
|---|---|---|
| 1-(hex-5-en-1-yl)-1,1,3,3-tetramethyldisiloxane | | 1 |
| Dimethylchlorosilane | | 2 |
| 5-hexenyldimethylchlorosilane | | 3 |
| 1,1,3,3,-tetramethyldisiloxane | | 4 |
| 5-hexenyldimethylsilanol | | 5 |
| 13-di(hex-5-en-1-yl)-1,13,3-tetramethyldisiloxane | | 6 |

EXAMPLES

Example 1

Synthesis of 1-(hex-5-en-1-yl)-1,1,3,3-tetramethyldisiloxane 1-(hex-5-en-1-yl)-1,1,3,3-tetramethyldisiloxane ("1") (e.g., 5-hexenyltetramethyldisiloxane) was prepared according to the following reaction:

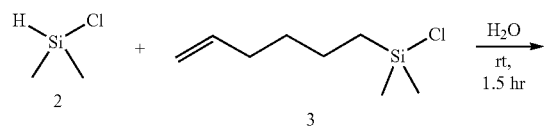

A 1L 3-neck round-bottom ("RB") flask equipped with a stir bar was connected to an addition funnel and a base scrubber. A mixture of 5-hexenyldimethylchlorosilane ("3") (200.0 g, 1.13 mol) and dimethylchlorosilane ("2") (107.1 g, 1.13 mol, 1 equiv.) was loaded into the addition funnel. The RB flask was charged with DI water (183.3 g), immersed in an ice/water bath, and allowed to cool down to 0° C. The chlorosilanes (e.g., 2 and 3) were added dropwise into the water upon vigorous stirring at a rate that kept the reaction temperature under 20° C. The reaction mixture was stirred at 20° C. for 1.5 hour after addition of the chlorosilanes.

The siloxane layer (top) was separated, washed with sat. $NaHCO_3$ solution (3×200 mL, stirred for 20 min each wash), $H_2O$ (200 mL), dried over $MgSO_4$ (4 g), and filtered to generate a colorless, clear liquid (225 g) crude product. FIG. 1 is a pair of NMR spectra showing the removal of 3 via the sodium bicarbonate wash step. Gas chromatography ("GC") analysis showed that the crude product was composed of 1-(hex-5-en-1-yl)-1,1,3,3-tetramethyldisiloxane (1) (77.2%), isomers of 1 containing internal olefin (3.0%), 1,1,3,3,-tetramethyldisiloxane (4) (2.2%), 5-hexenyldimethylsilanol (5) (1.8%), 1,3-di(hex-5-en-1-yl)-1,1,3,3-tetramethyldisiloxane (6) (13.4%), and isomers of 6 containing internal olefin (1.1%).

The crude product was purified by fractional distillation (20 Torr, 81-85° C.) to give a colorless liquid (160 g) purified product. Yield: 65%. GC analysis showed this purified product contained 1 (93.0%), isomers of 1 containing internal olefin (3.4%), and 5 (2.3%). The structure was characterized by multi-nuclear NMR. $^1$H NMR (CDCl$_3$, 400 MHz): 5.80 (m, 1H), 4.99 (m, 2H), 4.68 (m, 1H), 2.06 (m, 2H), 1.39 (m, 4H), 0.54 (m, 2H), 0.16 (s, 3H), 0.15 (s, 3H), 0.06 (s, 6H); $^{13}$C NMR (CDCl$_3$, 100 MHz): 139.0, 114.1, 33.5, 32.5, 22.7, 17.9, 0.9, 0 ppm; $^{29}$Si NMR (CDCl$_3$, 79 MHz): 9.8, −6.8 ppm.

Example 2

Synthesis of 1-(hex-5-en-1-yl)-1,1,3,3-tetramethyldisiloxane

A reaction was carried out using a process substantially similar to that described with respect to Example 1, except that the addition funnel received a mixture of 3 (100.0 g, 0.57 mol) and 0.7 equiv. of 2 (37.5 g, 0.40 mol) was loaded into the addition funnel. After addition of the chlorosilanes was complete, an additional 0.3 equiv. of 2 (16 g, 0.17 mol) was loaded and added dropwise into the reaction mixture upon vigorous stirring at a rate that kept the temperature under 20° C. The reaction mixture was stirred at 20° C. for 1.5 hour after addition.

A colorless, clear liquid (109 g) crude product was obtained after the separation, washing with sat. NaHCO$_3$ solution (3×90 mL, stirred for 20 min each wash) and H$_2$O (90 mL), and drying over MgSO$_4$ (2 g), and filtering. GC analysis showed that the crude product was composed of 1 (72.6%), isomers of 1 containing internal olefin (4.0%), 4 (2.3%), 5 (1.3%), 6 (14.4%), and isomers of 6 containing internal olefin (2.3%).

Example 3

Synthesis of 1-(hex-5-en-1-yl)-1,1,3,3-tetramethyldisiloxane

A reaction was carried out using a process substantially similar to that described with respect to Example 1, except that 1.3 equiv. of 2 (139.2 g, 1.47 mol) was loaded into the addition funnel.

A colorless, clear liquid (244 g) crude product was obtained after the separation, washing, and drying steps. GC analysis showed that the crude product was composed of 1 (83.0%), isomers of 1 containing internal olefin (3.2%), 4 (4.4%), 5 (0.02%), 6 (7.0%), and isomers of 6 containing internal olefin (0.6%).

The crude product was purified by fractional distillation (20 Torr, 81-85° C.) to give a colorless liquid (186 g) purified product. Yield: 76%. GC analysis showed this material contained 1 (95.5%), isomers of 1 containing internal olefin (3.5%), and 5 (0.02%). The structure was characterized by multi-nuclear NMR. $^1$H NMR (CDCl$_3$, 400 MHz): 5.80 (m, 1H), 4.99 (m, 2H), 4.68 (m, 1H), 2.06 (m, 2H), 1.39 (m, 4H), 0.54 (m, 2H), 0.16 (s, 3H), 0.15 (s, 3H), 0.06 (s, 6H); $^{13}$C NMR (CDCl$_3$, 100 MHz): 139.0, 114.1, 33.5, 32.5, 22.7, 17.9, 0.9, 0 ppm; $^{29}$Si NMR (CDCl$_3$, 79 MHz): 9.8, −6.8 ppm.

Example 4

Synthesis of 5-norbornen-2-yl(ethyl)-1,1,3,3-tetramethyldisiloxane 5-norbornen-2-yl(ethyl)-1,1,3,3-tetramethyldisiloxane (8) was prepared according to the following reaction:

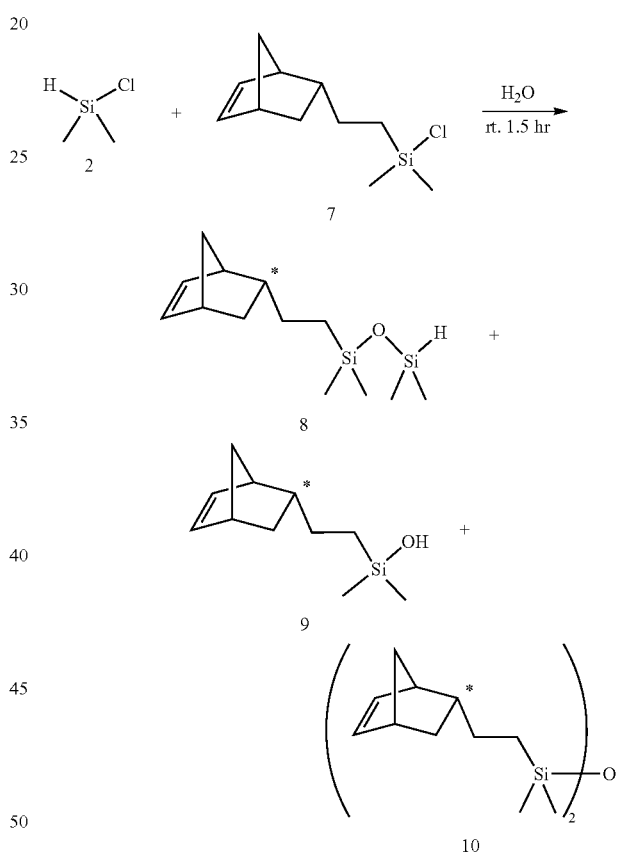

where 9 and 10 are byproducts (in addition to 1,1,3,3-tetramethyl disiloxane). The chemical names, corresponding structures, and numerical abbreviations used below are given in TABLE 2.

TABLE 2

| Chemical name | Structure | Abbreviation |
| --- | --- | --- |
| Dimethylchlorosilane | 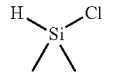 | 2 |

TABLE 2-continued

| Chemical name | Structure | Abbreviation |
|---|---|---|
| 5-norbornen-2-yl(ethyl)chlorodimethylsilane | | 7 |
| 1-(5-norbornen-2-yl-ethyl)-1,1,3,3-tetramethyldisiloxane | | 8 |
| 5-norbornen-2-yl(ethyl)dimethylsilanol | | 9 |
| 1,3-di(5-norbornen-2-yl-ethyl)-1,1,3,3-tetramethyldisiloxane | | 10 |

A 2L 3-neck RB flask equipped with a stir bar was connected to an addition funnel and a base scrubber. A mixture of 5-norbornen-2-yl(ethyl)chlorodimethylsilane (250 g, 1.16 mol) and dimethylchlorosilane (143 g, 1.51 mol, 1.3 equiv.) was loaded into the addition funnel. The RB flask was charged with DI water (420 g), immersed in an ice/water bath, and allowed to cool down to 0° C. Chlorosilanes were added dropwise into water upon vigorous stirring at a rate that kept the reaction temperature under 20° C. The reaction mixture was stirred at 20° C. for 90 min after addition of chlorosilanes.

The siloxane layer (top) was separated, washed with sat. NaHCO$_3$ solution (2×200 mL, stirred for 20 min each wash), H$_2$O (200 mL), dried over MgSO$_4$ (10 g), and filtered to generate a colorless, clear liquid (294 g) as the crude product. GC analysis of this liquid showed no detection of 5-norbornen-2-yl(ethyl)dimethylsilanol. Excluding the quantity of 1,1,3,3-tetramethyldisiloxane in this liquid, GC analysis showed 5-norbornen-2-yl(ethyl)-tetramethyldisiloxane (88%) and 1,1,3,3-tetramethyl-1,3-di(5-norbornen-2-yl(ethyl))-disiloxane (12%). The crude product was further purified by distillation under high vacuum at 120-130° C. to give the pure desired product as colorless clear liquid: 220 gram, 74% yield, a 5:1 mixture of endo/exo isomers. Major isomer: $^1$H NMR (400 MHz, CDCl$_3$): 6.10 (dd, J=4 & 8 Hz, 1H), 5.90 (dd, J=4 & 8 Hz, 1H), 4.69 (m, 1H), 2.80 (br., 1H), 2.74 (br. 1H), 1.94 (m, 1H), 1.84 (m, 1H), 1.42-1.03 (m, 4H), 0.62-0.47 (m, 3H), 0.16 (s, 3H), 0.16 (s, 3H), 0.05 (s, 6H); $^{13}$C NMR (100 MHz, CDCl$_3$): 136.9, 132.2, 49.5, 45.0, 42.6, 42.1, 32.4, 28.0, 17.0, 0.9, −0.06; $^{29}$Si NMR (79 MHz, CDCl$_3$): 9.8, −7.1 ppm. Minor isomer: $^1$H NMR (400 MHz, CDCl$_3$): 6.09 (dd, J=4 & 8 Hz, 1H), 6.02 (dd, J=4 & 8 Hz, 1H), 4.69 (m, 1H), 2.77 (br., 1H), 2.54 (br. 1H), 1.42-1.08 (m, 6H), 0.62-0.47 (m, 3H), 0.17 (s, 3H), 0.16 (s, 3H), 0.07 (s, 6H); $^{13}$C NMR (100 MHz, CDCl$_3$): 136.9, 136.2, 45.9, 45.1, 42.1, 41.8, 33.0, 29.8, 17.4, 0.9, −0.02, −0.06; $^{29}$Si NMR (79 MHz, CDCl$_3$): 9.7, −7.0 ppm.

Example 5

Synthesis of Vinyltetramethyldisiloxane

Vinyltetramethyldisiloxane (12) was prepared according to the following reaction:

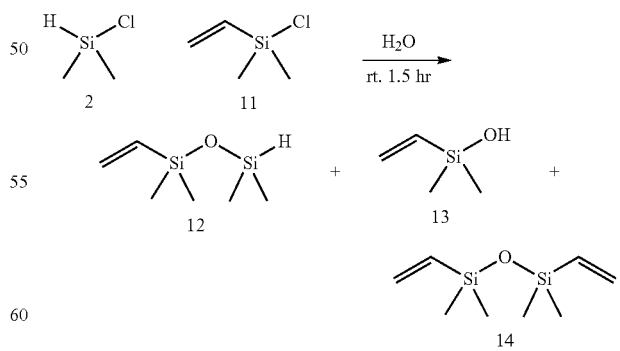

where 13 and 14 are byproducts (in addition to 1,1,3,3-tetramethyl disiloxane). The chemical names, corresponding structures, and numerical abbreviations used below are given in TABLE 3.

TABLE 3

| Chemical name | Structure | Abbreviation |
|---|---|---|
| Dimethylchlorosilane | H-Si(Cl)(CH₃)₂ | 2 |
| Dimethylvinylchlorosilane | CH₂=CH-Si(Cl)(CH₃)₂ | 11 |
| Vinyltetramethyldisiloxane | CH₂=CH-Si(CH₃)₂-O-Si(CH₃)₂-H | 12 |
| Vinyldimethylsilanol | CH₂=CH-Si(OH)(CH₃)₂ | 13 |
| 1,3-divinyl-1,1,3,3-tetramethyldisiloxane | CH₂=CH-Si(CH₃)₂-O-Si(CH₃)₂-CH=CH₂ | 14 |

A 250 mL 3-neck RB flask equipped with a stir bar was connected to an addition funnel and a base scrubber. A mixture of dimethylvinylchlorosilane (50.0 g, 0.41 mol) and dimethylchlorosilane (39.2 g, 0.41 mol, 1 equiv.) was loaded into the addition funnel. The RB flask was charged with DI water (67 g), immersed in an ice/water bath, and allowed to cool down to 0° C. Chlorosilanes were added dropwise into water upon vigorous stirring at a rate that kept the reaction temperature under 20° C. The reaction mixture was stirred at 20° C. for 5 min after addition of chlorosilanes.

The siloxane layer (top) was separated, washed with sat. NaHCO₃ solution (3×67 mL, stirred for 20 min each wash), H₂O (67 mL), dried over MgSO₄ (1.5 g), and filtered to generate a colorless, clear liquid (56.8 g). GC analysis showed that the crude product was composed of vinyltetramethyldisiloxane (62%), 1,1,3,3-tetramethyldisiloxane (11%), and 1,3-divinyl-1,1,3,3-tetramethyldisiloxane (26%). GC analysis showed no detection of vinyldimethylsilanol.

Example 6

Synthesis of Vinylpentamethyldisiloxane

Vinylpentamethyldisiloxane (16) was prepared according to the following reaction:

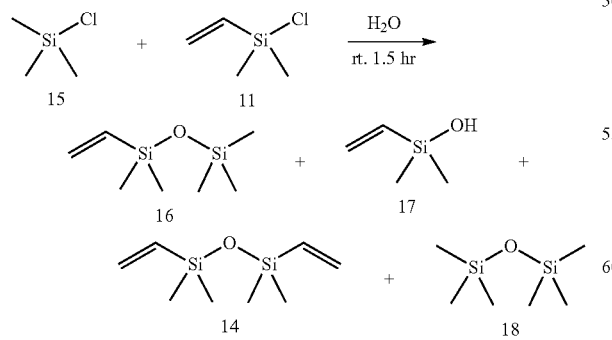

where 14, 17, and 18 are byproducts. The chemical names, corresponding structures, and numerical abbreviations used below are given in TABLE 4.

TABLE 4

| Chemical name | Structure | Abbreviation |
|---|---|---|
| Trimethylchlorosilane | (CH₃)₃Si-Cl | 15 |
| Dimethylvinylchlorosilane | CH₂=CH-Si(Cl)(CH₃)₂ | 11 |
| Vinylpentamethyldisiloxane | CH₂=CH-Si(CH₃)₂-O-Si(CH₃)₃ | 16 |
| Vinyldimethylsilanol | CH₂=CH-Si(OH)(CH₃)₂ | 17 |
| Hexamethyldisiloxane | (CH₃)₃Si-O-Si(CH₃)₃ | 18 |
| 13-divinyl-1,1,3,3-tetramethyldisiloxane | CH₂=CH-Si(CH₃)₂-O-Si(CH₃)₂-CH=CH₂ | 14 |

A 250 mL 3-neck RB flask equipped with a stir bar was connected to an addition funnel and a base scrubber. A mixture of dimethylvinylchlorosilane (50.0 g, 0.41 mol) and trimethylchlorosilane (45.0 g, 0.41 mol, 1 equiv.) was loaded into the addition funnel. The RB flask was charged with DI water (67 g), immersed in an ice/water bath, and allowed to cool down to 0° C. Chlorosilanes were added dropwise into water upon vigorous stirring at a rate that kept the reaction temperature under 20° C. The reaction mixture was stirred at 20° C. for 5 min after addition of chlorosilanes. The siloxane layer (top) was separated, washed with sat. NaHCO₃ solution (3×67 mL, stirred for 20 min each wash), H₂O (67 mL), dried over MgSO₄ (1.5 g), and filtered to generate a colorless, clear liquid (56.8 g). GC analysis showed that the crude product was composed of vinylpentamethyldisiloxane (49%), hexamethyldisiloxane (22%), vinyldimethylsilanol (0.9%), 1,3-divinyl-1,1,3,3-tetramethyldisiloxane (28%).

Example 7

Synthesis of 5-hexenylpentamethyldisiloxane 5-hexenylpentamethyldisiloxane (e.g., 1-(hex-5-en-1-yl)-1,1,3,3,3-pentamethyldisiloxane) (19) was prepared according to the following reaction:

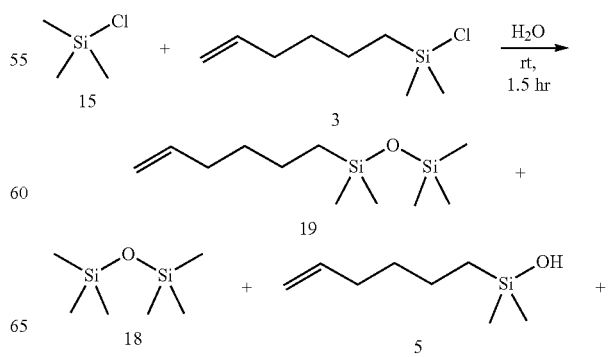

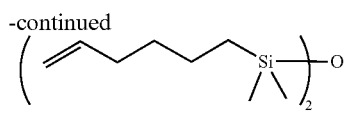

where 5, 6 and 18 are byproducts. The chemical names, corresponding structures and numerical abbreviations used below are given in TABLE 5.

TABLE 5

| Chemical name | Structure | Abbreviation |
|---|---|---|
| Trimethylchlorosilane | | 15 |
| 5-hexenyldimethylchlorosilane | | 3 |
| 5-hexenylpentamethyldisiloxane | | 19 |
| Hexamethyldisiloxane | | 18 |
| 5-hexenyldimethylsilanol | | 5 |
| 1,1,3,3-tetramethyl-1,3-di(5-hexenyl)-disiloxane | | 6 |

A 250 mL 3-neck RB flask equipped with a stir bar was connected to an addition funnel and a base scrubber. A mixture of 5-hexenyldimethylchlorosilane (60.0 g, 0.34 mol) and trimethylchlorosilane (36.9 g, 0.34 mol 1 equiv.) was loaded into the addition funnel. The RB flask was charged with DI water (55.0 g), immersed in an ice/water bath, and allowed to cool down to 0° C. Chlorosilanes were added dropwise into water upon vigorous stirring at a rate that kept the reaction temperature under 20° C. The reaction mixture was stirred at 20° C. for 5 min after addition of chlorosilanes.

The siloxane layer (top) was separated, washed with sat. NaHCO$_3$ solution (3×55 mL, stirred for 20 min each wash), H$_2$O (55 mL), dried over MgSO$_4$ (1.2 g), and filtered to generate a colorless, clear liquid (68.6 g). GC analysis showed that the crude product was composed of 5-hexenylpentamethyldisiloxane (27%), isomers of 5-hexenylpentamethyldisiloxane containing internal olefin (2.0%), hexamethyldisiloxane (20%), 5-hexenyldimethylsilanol (2.1%), 1,1,3,3-tetramethyl-1,3-di(5-hexenyl)-disiloxane (43%), isomers of 1,1,3,3-tetramethyl-1,3-di(5-hexenyl)-disiloxane containing internal olefin (6%).

It is understood that this disclosure is not limited to the embodiments specifically disclosed and exemplified herein. Various modifications of the invention will be apparent to those skilled in the art. Such changes and modifications may be made without departing from the scope of the appended claims. Moreover, each recited range includes all combinations and sub-combinations of ranges, as well as specific numerals contained therein.

The invention claimed is:

1. A process for making alkenyl disiloxanes, comprising:
combining an alkenyl halosilane with an alkyl halosilane and adding the mixture to water, an acidic aqueous solution, or a basic aqueous solution, wherein:

the alkenyl halosilane has Formula A

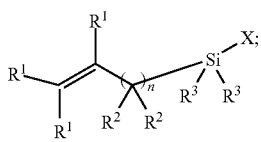

and
the alkyl halosilane has Formula B

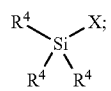

wherein:
X is, independently at each occurrence, F, Cl, Br or I;
n is 0, 1, 2, 3, 4, 5, or 6;
R$^1$ is, independently at each occurrence, H or C1-C3 alkyl;
R$^2$ is, independently at each occurrence, H or C1-C3 alkyl;

also provided that one or more of $R^1$ and one or more of $R^2$ can combine to form a ring;

$R^3$ is, independently at each occurrence, H or C1-C6 alkyl;

one $R^4$ is H; and each remaining $R^4$ are C1-C3 alkyl at each occurrence.

2. The process of claim 1, wherein the ratio of the alkenyl halosilane to the alkyl halosilane is about 1:5 to about 1:0.5.

3. The process of claim 1, wherein the alkenyl halosilane to the alkyl halosilane are mixed at about 20° C. to about 45° C.

4. The process of claim 1, further comprising separating the reaction product to form an aqueous layer and a siloxane layer containing the alkenyl disiloxane, and washing the siloxane layer with a bicarbonate solution.

5. The process of claim 4, further comprising drying the siloxane layer after washing.

6. The process of claim 1, further comprising recovering the alkenyl disiloxane.

7. The process of claim 1, wherein the alkenyl disiloxane is a compound of a Formula I:

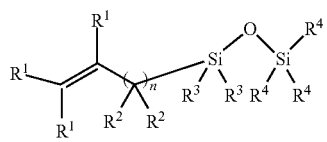

I wherein:

n is 0, 1, 2, 3, 4, 5, or 6;

$R^1$ is, independently at each occurrence, H or C1-C3 alkyl;

$R^2$ is, independently at each occurrence, H or C1-C3 alkyl;

also provided that one or more of $R^1$ and one or more of $R^2$ can combine to form a ring;

$R^3$ is, independently at each occurrence, H or C1-C6 alkyl;

one $R^4$ is H; and each remaining $R^4$ are C1-C3 alkyl at each occurrence.

8. The process of claim 1, wherein the alkenyl disiloxane is 1-(hex-5-en-1-yl)-1,1,3,3-tetramethyldisiloxane, 5-norbornen-2-yl(ethyl)-1,1,3,3-tetramethyldisiloxane, or vinyltetramethyldisiloxane.

9. The process of claim 1, wherein X is Cl and $R^3$ is methyl at both occurrences.

10. The process of claim 1, wherein the compound of Formula A is 5-hexenyldimethylchlorosilane, 5-norbornen-2-yl(ethyl)chlorodimethylsilane, or dimethylvinylchlorosilane.

11. The process of claim 1, wherein X is Cl and two of $R^4$ are methyl.

12. The process of claim 1, wherein the compound of Formula B is dimethylchlorosilane or trimethylchlorosilane.

13. The process of claim 4, further comprising recovering the alkenyl disiloxane.

14. The process of claim 5, further comprising recovering the alkenyl disiloxane.

15. The process of claim 1, wherein one or more of $R^1$ and one or more of $R^2$ combine to form a ring.

16. The process of claim 15, wherein the compound of Formula A is 5-norbornen-2-yl(ethyl)chlorodimethylsilane.

17. The process of claim 1, wherein n is 3, 4, or 5.

18. The process of claim 7, wherein one or more of $R^1$ and one or more of $R^2$ combine to form a 5 to 8-membered ring.

19. The process of claim 18, wherein the ring comprises 5-norbornen-2-yl.

20. The process of claim 7, wherein n is 3, 4, or 5.

* * * * *